US012669880B2

(12) United States Patent
Yang et al.

(10) Patent No.: US 12,669,880 B2
(45) Date of Patent: Jun. 30, 2026

(54) STYLUS, HANDWRITING SYSTEM USING THE SAME AND OPERATING METHOD THEREOF

(71) Applicant: PIXART IMAGING INC., Hsin-Chu County (TW)

(72) Inventors: Shu-Sian Yang, Hsin-Chu County (TW); Yi-Chung Chen, Hsin-Chu County (TW); Chung-Ting Yang, Hsin-Chu County (TW); Chia-Fu Ke, Hsin-Chu County (TW); Chin-Seang Seow, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/979,454

(22) Filed: Dec. 12, 2024

(65) Prior Publication Data

US 2026/0169576 A1 Jun. 18, 2026

(51) Int. Cl.
*G06F 3/038* (2013.01)
*G06F 3/0354* (2013.01)

(52) U.S. Cl.
CPC .......... *G06F 3/038* (2013.01); *G06F 3/03545* (2013.01); *G06F 3/03547* (2013.01)

(58) Field of Classification Search
CPC ... G06F 3/038; G06F 3/03545; G06F 3/03547
See application file for complete search history.

(56) References Cited

U.S. PATENT DOCUMENTS

| | | | | |
|---|---|---|---|---|
| 9,354,728 B2* | 5/2016 | Yilmaz | ................. | G06F 3/0383 |
| 10,572,063 B2* | 2/2020 | Case, Jr. | ............... | G06F 3/0383 |
| 10,915,184 B1 | 2/2021 | Su | | |
| 11,269,429 B2* | 3/2022 | Yilmaz | ................. | G06F 3/0441 |
| 2007/0025618 A1* | 2/2007 | Lin | ....................... | G06V 30/347 |
| | | | | 382/186 |
| 2008/0297478 A1 | 12/2008 | Hotelling et al. | | |
| 2011/0063258 A1* | 3/2011 | Zhang | ................. | G06F 3/04166 |
| | | | | 345/178 |
| 2011/0162894 A1* | 7/2011 | Weber | ................. | G06F 3/03545 |
| | | | | 178/19.03 |
| 2012/0327040 A1* | 12/2012 | Simon | ................. | G06F 3/03545 |
| | | | | 345/179 |
| 2014/0160092 A1* | 6/2014 | Tseng | .................... | G06F 3/0321 |
| | | | | 345/182 |
| 2014/0210744 A1* | 7/2014 | Song | .................... | G06F 3/04883 |
| | | | | 345/173 |
| 2017/0192537 A1* | 7/2017 | Timothy | ............. | G06F 3/03545 |

(Continued)

FOREIGN PATENT DOCUMENTS

| | | |
|---|---|---|
| CN | 104077044 A | 10/2014 |
| CN | 108780365 A | 11/2018 |

*Primary Examiner* — Ariel A Balaoing
(74) *Attorney, Agent, or Firm* — HAUPTMAN HAM, LLP

(57) ABSTRACT

There is provided a handwriting system including a stylus, a touchpad, a memory, a processor and a display. The touchpad is arranged at a predetermined position on the stylus for detecting a position/angle of a user holding the stylus. The memory is used to record reference information associated with the touchpad. The processor is used to compare current information associated with the touchpad and the reference information to calibrate an offset of a current track of the stylus. The display is used to show a calibrated track.

19 Claims, 5 Drawing Sheets

Img_1 current track    calibrated track

(56)      References Cited

U.S. PATENT DOCUMENTS

2018/0025248 A1*   1/2018  Shan ..................... G06F 3/017
                                                    382/189
2018/0088686 A1     3/2018  Zuber et al.
2018/0338065 A1*  11/2018  Zyskind .............. G06V 30/347
2022/0261146 A1*   8/2022  Zheng .................... G06T 11/20
2022/0357843 A1*  11/2022  Jia ...................... G06F 3/04883
2024/0273787 A1*   8/2024  Wu ...................... G06T 11/203
2025/0077069 A1*   3/2025  Wu ..................... G06F 3/04845

* cited by examiner

100

300

14 touchpad reference info.

current info.

16 processor

AI

Sw, Strig 18 memory 17 light source image sensor 1.position/angle difference
2.calibrated angle
3.calibrated track
4.identity recognize result 32 host 20 display

STYLUS, HANDWRITING SYSTEM USING THE SAME AND OPERATING METHOD THEREOF

FIELD OF THE DISCLOSURE

This disclosure generally relates to a stylus and, more particularly, to a stylus that automatically calibrates a current holding position/angle of a user according to a reference holding posture of the user to generate a calibrated track, and a handwriting system including the stylus and an operating method of the system.

BACKGROUND OF THE DISCLOSURE

The mouse device has been used as a human-machine interface for a long time to control a cursor on an operation screen and to click on an icon to operate application software. The conventional mouse devices are put on a desktop for being operated by the user, and thus the operating performance can be affected by the desktop material.

Accordingly, there is a kind of commercial pen mouse available for the user to operate like holding a pen. The pen mouse is suitable to be operated on any kind of work surfaces without being affected by the material thereof. However, because the pen mouse has a cylindrical shape, it does not have explicit front and back directions as the conventional mouse devices. Thus, a holding direction of the pen mouse can affect the movement of a cursor track.

Therefore, a pen mouse whose cursor track is not affected by different holding directions of a user is required.

The information disclosed in this BACKGROUND is merely intended to increase understanding of the general background of the invention and should not be taken as an admission or in any way implied that the relevant information constitutes prior art that is already known to a person of ordinary skill in the art.

SUMMARY

Accordingly, the present disclosure provides a stylus that automatically calibrates a current track according to a difference between a reference holding position/angle in a learning mode and a current holding position/angle in an operating mode, and a handwriting system including the stylus and an operating method of the handwriting system.

The present disclosure provides a stylus that uses a touchpad to provide reference holding information for calibrating a current holding position/angle of a user, and a handwriting system including the stylus and an operating method of the handwriting system.

The present disclosure further provides a stylus that uses a touchpad to provide reference holding information for identifying an identity of a current user, and a handwriting system including the stylus and an operating method of the handwriting system.

The present disclosure provides a stylus including a pen shaft, a touchpad, a memory and a processor. The touchpad is arranged on a part of a surface of the pen shaft for being held by a user. The memory is configured to record reference information associated with the touchpad. The processor is configured to compare current information associated with the touchpad with the reference information to calibrate an offset of a current track of the stylus caused by the user holding at different positions of the touchpad.

The present disclosure further provides a handwriting system including a host and a stylus. The host includes a display to show a cursor track. The stylus is coupled with the host and includes a touchpad. The stylus is configured to record reference information associated with the touchpad, compare current information associated with the touchpad and the reference information to calculate an angle difference between a reference angle and a current angle that the user holds the stylus, and output the angle difference, a calibrated angle or a calibrated track to the host to show the calibrated track on the display.

The present disclosure further provides an operating method of a handwriting system. The handwriting system includes a stylus having a touchpad and a host having a display. The operating method includes the steps of: entering a learning mode to record reference information associated with the touchpad; entering an operating mode to acquire current information associated with the touchpad, and to compare the current information and the reference information to generate calibration information; and outputting the calibration information to the host to show a calibrated track on the display.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide a stylus that automatically calibrates a current holding position/angle according to reference information obtained in a learning mode, a handwriting system including the stylus and an operating method thereof. The user needs to enter the learning mode only once (e.g., after installation of the system), without entering in each operation, to obtain the reference information which is continuously used to calibrate a current track.

Another objective of the present disclosure is to cause the stylus to analyze and learn an operating feature from the reference information to perform user identity recognition to classify a valid user and an invalid user. The invalid user is not allowed to use the stylus of the present disclosure to operate a host thereby improving the data security of a handwriting system. Different valid users may perform different operations limited to his/her identity.

Figure 1A:
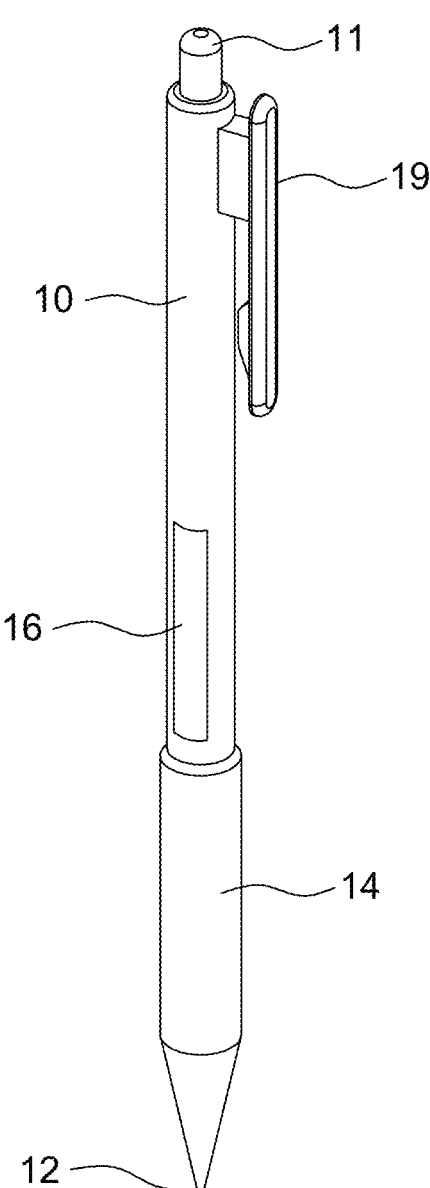
FIG. 1A is a solid diagram of a stylus according to one embodiment of the present disclosure.
Figure 1B:
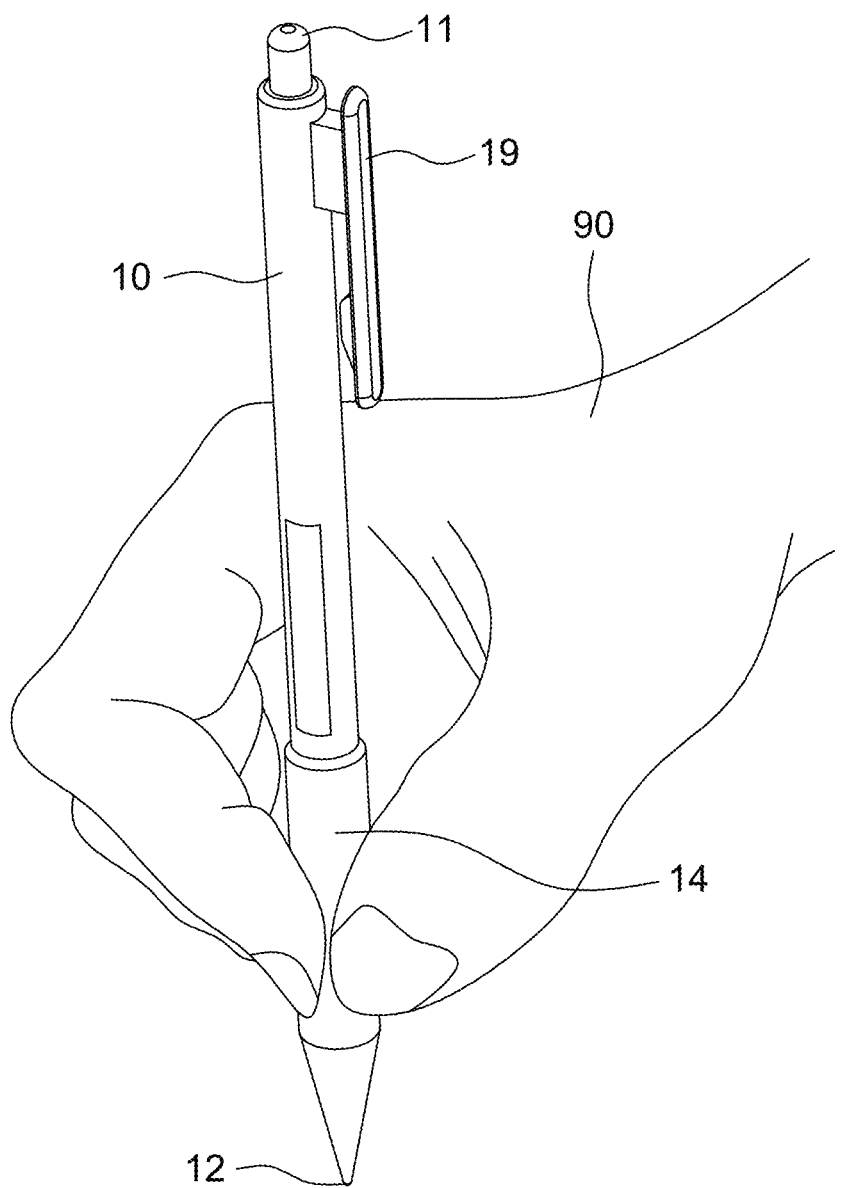
FIG. 1B is a schematic diagram of a user holding a stylus according to one embodiment of the present disclosure.

Please refer to FIGS. 1A and 1B, FIG. 1A is a solid diagram of a stylus 100 according to one embodiment of the present disclosure; and FIG. 1B is a schematic diagram of a user holding a stylus 100 according to one embodiment of the present disclosure.

The stylus 100 includes a pen shaft 10, a pen tail 11, a pen tip 12, a touchpad 14, a processor 16, a memory 18 (referring to FIG. 3) and a pen clip 19. The pen tip 12 is at a front end of the pen shaft 10, and the pen tail 11 is at a back end of the pen shaft 10. The pen clip 19 may be used to indicate a rotating direction of the stylus 100.

In one aspect, the stylus 100 does not include the pen clip 19. In another aspect, the stylus 100 further includes a mode switch device for the mode switching between a learning mode and an operating mode. The mode switch device is arranged, for example, at the pen clip 19 (e.g., implemented by moving the pen clip 19 up and down), at the pen tail 11 (e.g., implemented by pressing the pen tail 11), or at other locations (e.g., arranging as a button) without particular limitations. In a further aspect, the stylus 100 does not include the mode switch device, but the mode switching is triggered by receiving a switching signal Sw (referring to FIG. 3) from a host 32, which is wirelessly coupled to the stylus 100, e.g., via Bluetooth connection or Wi-Fi connection. The host 32 generates the switching signal Sw when a mode switching function is executed by a user.

In one embodiment, the stylus 100 further includes an optical navigation device 17 (referring to FIG. 3) arranged in the pen tip 12 to detect a moving track of the stylus 100 with respect to a work surface. For example, the optical navigation device 17 includes a light source and an image sensor (referring to FIG. 3). The light source is used to illuminate the work surface in front of the pen tip 12. The image sensor is used to acquire image frames of the work surface in front of the pen tip 12 and to send the image frames to the processor 16. The processor 16 calculates displacement between the stylus 100 and the work surface using different image frames (e.g., calculating correlation between two image frames, but not limited thereto), and successive displacement form the moving track. The processor 16 may calculate the displacement using the methods known to the art, which is not a main objective of the present disclosure and thus details thereof are not described herein. One objective of the present disclosure is to calibrate an offset of the current track of the stylus 100 (e.g., referring to FIGS. 2B and 2C) caused by a user (e.g., shown as a hand 90 in FIG. 1B) holding at different positions/angles of the pen shaft 10.

Another objective of the present disclosure is to detect a tilted angle (with respect to a vertical direction) and a rotation angle that the user holds the pen shaft 10. For example, when a user holds the pen shaft 10 at a larger tilted angle, the user may hold at higher position(s) of the touchpad 14, and when the user holds the pen shaft 10 at a smaller tilted angle, the user may hold at lower position(s) of the touchpad 14. The rotation angle is calculated based on transverse displacement of objects between images, e.g., referring to FIGS. 2A-2C. For example, different tilted angles and rotation angles are used to give different features or types on user's handwrite shown on the display 20. For example, a first tilted angle and rotation angle is used to form a wider pen track (e.g., like brush) and/or having a first track color and/or having solid line track; and a second tilted angle and rotation angle is used to form a thinner pen track (e.g., like ball pen) and/or having a second track color and/or having dotted line track, but not limited to. Said features or types are determined according to different applications of the host 32.

In another aspect, the stylus 100 further includes a pressure sensor (not shown) arranged in the pen tip 12 to detect whether the stylus 100 is pressed against the work surface or not.

The touchpad 14 is arranged at a proper position of the pen shaft 10. In one aspect, the touchpad 14 is arranged at a part of a surface of the pen shaft 10 for being held by a user (e.g., a region close to the pen tip 12), but not limited thereto. In another aspect, the touchpad 14 is arranged at a region from above the pen tip 12 toward the pen tail 11 to cover more than a half of the pen shaft 10. Preferably, the touchpad 14 circles the surface of the pen shaft 10 in a tangential direction such that the touchpad 14 is touched at any angle when the user holds the pen shaft 10. The touchpad 14 is, for example, a capacitive touchpad, but not limited to. Any touching device that outputs corresponding data in response to a user's touch may be used as the touchpad 14.

The memory 18 includes a volatile memory and/or a non-volatile memory that is used to record software for running the stylus 100 and reference information associated with the touchpad 14 for calibration and calculating the tilted angle and the rotation angle. As mentioned above, the tilted angle and the rotation angle are used to give different features or types of user's handwrite to be shown on the display 20. In one aspect, the reference information is obtained and recorded in a learning mode. As mentioned above, the learning mode is entered by a user operating a mode switch device (e.g., moving the pen clip 19 up and down) or controlling the host 32 to send the switching signal Sw.

In one aspect, the reference information includes reference raw data outputted by the touchpad 14 in a learning mode, reference object information and reference feature information obtained by processing the reference raw data by the processor 16. The reference raw data (e.g., shown as Img_0) is determined according to a type of the touch pad 14 and includes sensing values of the touch pad 14, e.g., sensed capacitance.

Figure 2A:
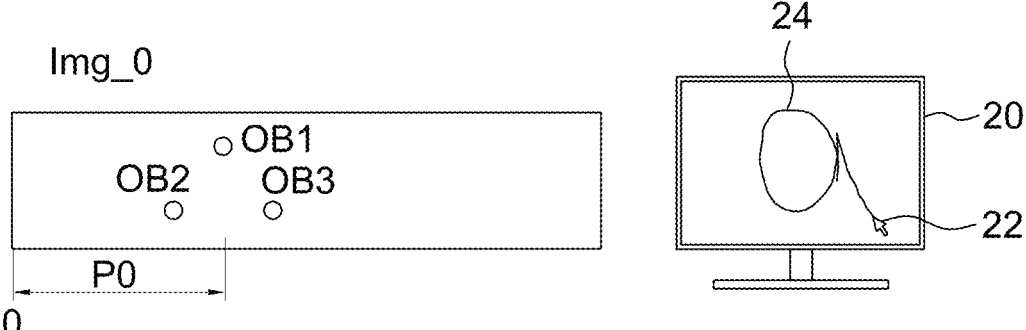
FIG. 2A is a schematic diagram of reference detection data and a reference track of a stylus according to one embodiment of the present disclosure.

The reference object information includes at least one of a respective position, a respective angle, a position of center of gravity and an average angle of multiple fingers on the touchpad 14. For example, FIG. 1B shows that a user 90 holds the touchpad 14 with three fingers. It is appreciated that a number of used fingers is determined according to a habit of different users, and is not limited to three. Please refer to FIG. 2A, an image Img_0 outputted by the touchpad 14 is spread as a rectangular space for illustration purposes. As shown in FIG. 2A, the image Img_0 includes three objects OB1, OB2 and OB3 respectively corresponding to three fingers, wherein the objects are formed by pixels having touch sensing values exceeding a predetermined threshold. In one aspect, one end of the image Img_0 (e.g. left end) is set as an original 0, and thus respective positions and a position of center of gravity of the objects OB1, OB2 and OB3 are obtainable by the processor 16, e.g., a position of the object OB1 being shown as P0. Since a number of pixels in a transverse direction is corresponding to 360 degrees, an angle corresponding to each pixel is calculated as 360/N degrees when the number of pixels is N. In this way, after positions of every object OB1, OB2 and OB3 are obtained, the processor 16 calculates respective angles and an average angle correspondingly. After obtaining the reference object information, the processor 16 stores the reference object information into the memory 18.

The reference feature information includes at least one of a respective size, a holding posture and a number of multiple fingers on the touchpad 14. In FIG. 2A, sizes of the objects OB1, OB2 and OB3 are determined by a number of pixels having touch sensing values larger than the predetermined threshold. The holding posture is determined according to a spatial relationship of the objects OB1, OB2 and OB3 in a 2-dimensional space formed by the image, e.g., side lengths and included angles of a triangle formed by the objects OB1, OB2 and OB3. It is appreciated that when the user 90 uses four fingers or five fingers to hold the pen shaft 10, a quadrangle or a pentagon is formed. After obtaining the reference feature information, the processor 16 stores the reference feature information into the memory 18.

It should be mentioned that although the display 20 in FIG. 2A shows a track drawn by a cursor 22, it is only intended to show a reference track 24 being drawn when the holding position in FIG. 2A is used as a reference position. In the learning mode, the user only needs to hold the stylus 100 to record the reference information without moving the stylus 100 to generate the reference track 24. That is, the reference track 24 is used to be compared with the calibrated track in FIGS. 2B and 2C to show that the calibrated track no longer has an offset, and the reference track 24 is not required to be recorded in the learning mode.

The processor 16 is, for example, an application specific integrated circuit (ASIC), a digital signal processor (DSP) or a field programmable gate array (FPGA) that uses software, firmware and/or hardware to implement functions thereof. The processor 16 is used to compare current information associated with the touchpad 14 and the reference information to calibrate an offset of a current track of the stylus 100 caused by the user 90 holding at different positions of the touchpad 14.

In one aspect, the current information is obtained in an operating mode. In the present disclosure, a mode that the user is actually operating the stylus 100 is referred to the operating mode. Or a mode rather than the learning mode is referred to the operating mode.

Figure 2B:
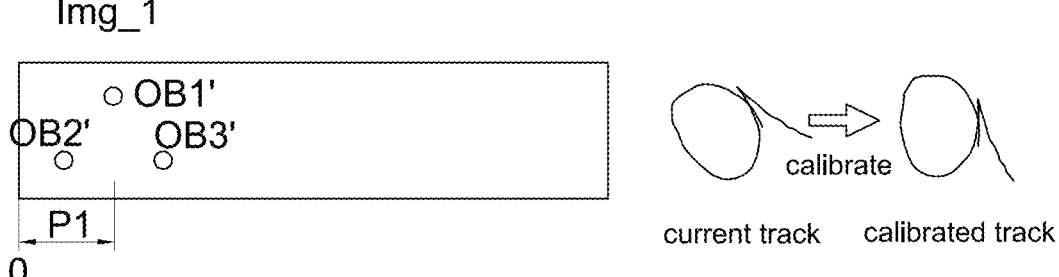
FIGS. 2B and 2C are schematic diagrams of current detection data, a current track and a calibrated track of a stylus according to one embodiment of the present disclosure.
Figure 2C:
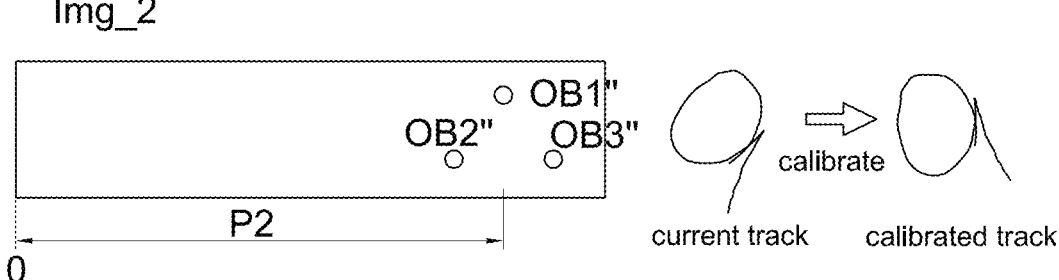

Please refer to FIGS. 2B and 2C, they respectively show a touch sensing result when the user 90 holds at different positions, e.g., the image Img_1 showing the objects OB1', OB2' and OB3' being closer to the original 0 and a current track (i.e. the track obtained in the operating mode) having a counter clockwise offset compared with the reference track 24; and the image Img_2 showing the objects OB1", OB2" and OB3" being farther from the original 0 and a current track having a clockwise offset compared with the reference track 24. It should be mentioned that the relationship between a rotating direction and a position offset (e.g., P0-P1 or P0-P2) mentioned herein is only intended to illustrate but not to limit the present disclosure.

It is appreciated that when the user holds the pen shaft 10 at the positions as shown in FIG. 2B in the learning mode, the image Img_1 is used to generate reference information; and when the user holds the pen shaft 10 at the positions as shown in FIG. 2C in the learning mode, the image Img_2 is used to generate reference information.

In one aspect, the current information includes current raw data outputted by the touchpad 14 in an operating mode, current object information and current feature information obtained by processing the current raw data by the processor 16. In the present disclosure, the current raw data, the current object information and the current feature information are respectively identical to the reference raw data, the reference object information and the reference feature information mentioned above but with a different that they are obtained in a mode different from the learning mode. That is, the current object information includes at least one of a respective position, a respective angle, a position of center of gravity and an average angle of multiple fingers on the touchpad 14 in the operating mode; and the current feature information includes at least one of a respective size, a holding posture and a number of the multiple fingers on the touchpad 14 in the operating mode.

Figure 3:
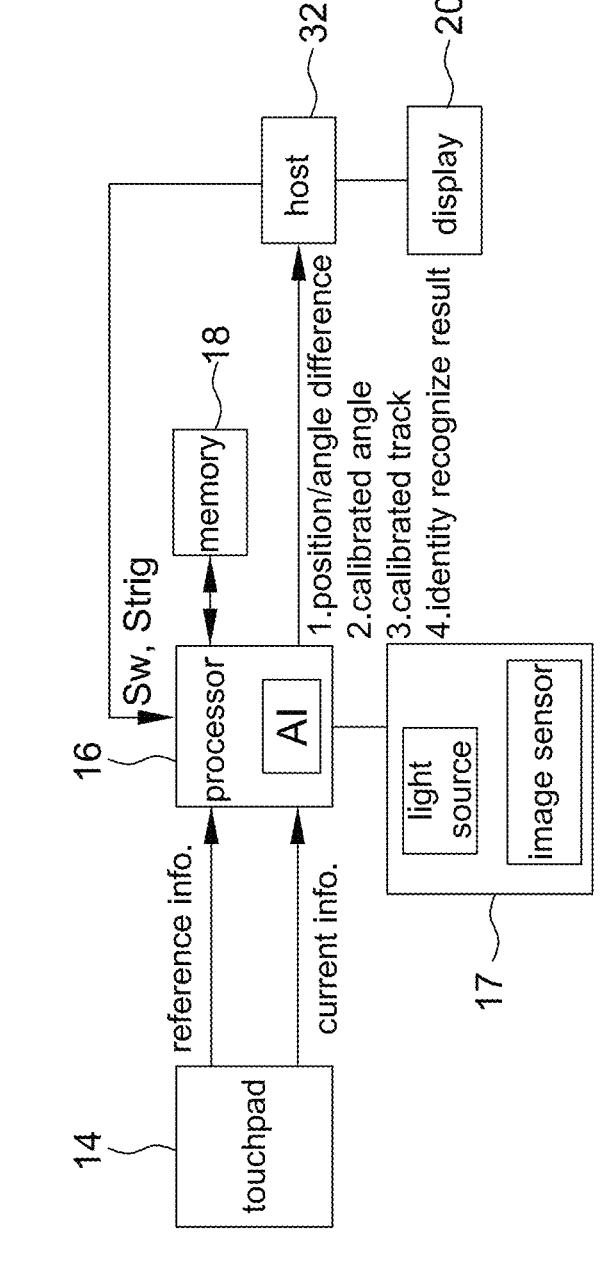
FIG. 3 is a schematic diagram of a handwriting system according to one embodiment of the present disclosure.

Please refer to FIG. 3, it is a schematic diagram of a handwriting system 300 according to one embodiment of the present disclosure. The processor 16 is used to compare the current information and the reference information to calculate an angle difference (or position difference) between a reference angle (e.g., referring to FIG. 2A) and a current angle (e.g., referring to FIG. 2B or 2C) that a user 90 holds the stylus 100 to output the angle difference, a calibrated angle or a calibrate track to a host 32.

For example, after the processor 16 of the stylus 100 calculates an angle difference between FIG. 2A and FIG. 2B or 2C (e.g., according to the position difference P0-P1 or P0-P2), the angle difference is outputted to the host 32 and an operating system (OS) of the host 32 uses this angle difference to calibrate a current angle in FIG. 2B or 2C to calibrate the current track. In this way, a calibrated track is shown on the display 20.

For example, after the processor 16 of the stylus 100 calculates an angle difference between FIG. 2A and FIG. 2B or 2C, the processor 16 uses this angle difference to calibrate a current angle in FIG. 2B or 2C and the calibrated angle is outputted to the host 32. The operating system of the host 32 uses this calibrated angle to calibrate the current track. In this way, a calibrated track is shown on the display 20.

For example, after the processor 16 of the stylus 100 calculates an angle difference between FIG. 2A and FIG. 2B or 2C, the processor 16 directly uses this angle difference to generate a calibrated track and outputs the calibrated track to the host 32. The operating system of the host 32 directly draws the calibrated track on the display 20.

In one aspect, the processor 16 includes an artificial intellectual (AI) engine (e.g., a Neural Network based model, but not limited to), which outputs the angle difference between a current angle and a reference angle according to the current information and the reference information. It is seen from FIGS. 2B and 2C that the calibrated track is identical to the reference track 24 shown in FIG. 2A. That means the offset on the current track due to different holding positions/angles of the user 90 is removed.

In a further aspect, the host 32 (more specification MUC or GPU thereof) calculates the angle difference as mentioned in the above paragraphs, and the stylus 100 only outputs the current information to the host 32 for the calculation. In this case, the reference information is recorded in the host 32, e.g., a memory thereof.

In a further aspect, the AI engine is previously trained by the reference information to construct a model and parameters thereof. In operating mode, the AI engine receives current information and directly generates the calibrated track based on the pre-trained model without outputting the angle difference. In one aspect, the AI engine is embedded in the host 32 and the stylus 100 outputs the current information to the host 32 as input of the AI engine. In this case, the training of the model is performed in the host 32 or transferred from the stylus 100 to the host 32. Furthermore, the processor 16 of the stylus 100 of the present disclosure further learns and records an operating feature of a valid user according to the reference feature information. The valid user is, for example, a user passing an authentication (e.g., biological authentication or password authentication) in the learning mode. For example, the operating feature includes a number of fingers, a holding posture (e.g., determined according to the spatial relationship between multiple objects) and a holding force (e.g., determined according to sizes of the multiple objects). The operating feature is learned and obtained by the AI engine prior to the operating mode to generate a learning model and parameters.

In the operating mode, the processor 16 performs user identify recognition according to the current feature information and the operating feature of the valid user. The processor 16 does not output information associated with the current track (e.g., including the angle difference, the calibrated angle or the calibrated track) to the post host 32 upon an invalid user being identified in the user identify recognition, or even does not detect the current track. In another aspect, processor 16 outputs a hint signal to the post host 32 to control the display 20 to show a message of invalid operation upon an invalid user being identified in the user identify recognition. In the present disclosure, since the host 32 is at downstream of the stylus 100, the host 32 is sometimes called post host.

In the user identify recognition, the processor 16 further identifies a user as a child according to objects appearing in the image outputted by the touchpad 14. For example, the memory 18 further records at least one area/force threshold to distinguish a child from an adult. For example, when sizes of the objects, e.g., OB1', OB2' and OB3' in FIG. 2B, are smaller than the at least one area/force threshold (e.g., each finger having a respective threshold), the processor 16 identifies the user as a child and informs the operation system (OS) of the host 32. The host 32 is embedded with some functions to protect the children operation, e.g., not allowed to login some websites or limited operation time.

In one aspect, the host 32 triggers an identity recognition mode (e.g., sending a trigger signal Strig) to cause the stylus 100 to recognize a user identity. After the stylus 100 (more specifically the processor 16 thereof) recognizes the user identity, the stylus 100 responds an identity signal to the host 32 such that the host 32 runs corresponding operations.

Please refer to FIG. 3 again, the handwriting system 300 of the preset disclosure includes a host 32 and a stylus 100 (referring to FIG. 1A). The host 20 includes a display 20 for showing a track of a cursor 22, wherein the display 20 is embedded in the host 32 or physically separated from the host 32. The host 32 is a computer system such as a notebook computer, a workstation, a tablet computer or a smart phone, but not limited thereto. As mentioned above, the pen mouse 10 is coupled to the host 32 and includes a touchpad 14. The stylus 100 is used to record reference information associated with the touchpad 14, compare current information associated with the touchpad 14 and the reference information to calculate an angle difference between a reference angle and a current angle that the user holds the stylus 100, and output the angle difference, a calibrated angle or a calibrated track to the host 32 to show a calibrated track on the display 20. Details of the current information and the reference information have been illustrated above, and thus details thereof are not repeated.

The identity recognize result shown in FIG. 3 includes at least one of whether a current user is a valid user or not and an identity of the valid user.

Figure 4:
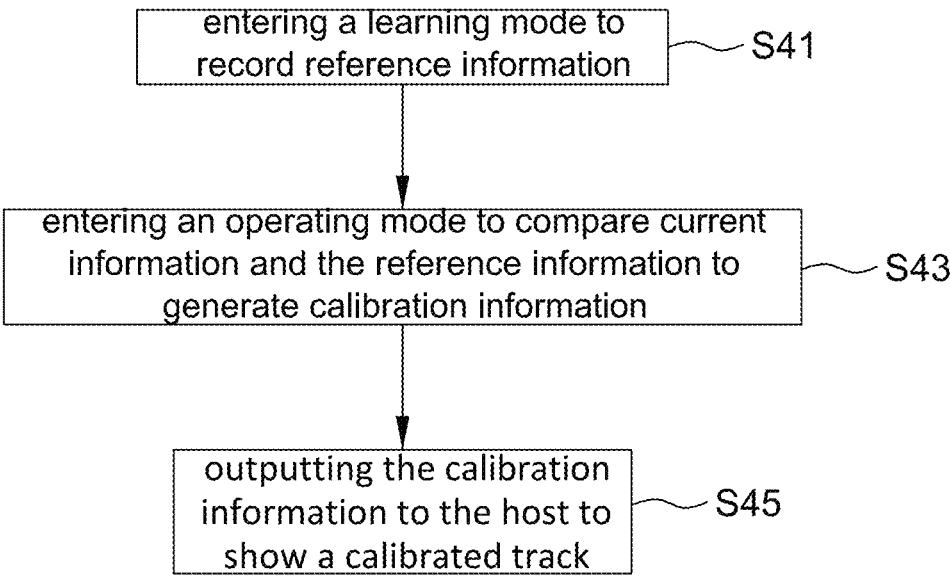
FIG. 4 is flow chart of a handwriting system according to one embodiment of the present disclosure.

Please refer to FIG. 4, it is a flow chart of an operating method of a handwriting system 300 according to one embodiment of the present disclosure, including the steps of: entering a learning mode to record reference information associated with a touchpad (Step S41); entering an operating mode to acquire current information associated with the touchpad, and to compare the current information and the reference information to generate calibration information (Step S43); and outputting the calibration information to a host to show a calibrated track on a display (Step S45).

Step S41: As mentioned above, the user controls the stylus 100 to enter a learning mode by a mode switch device or by the host 32 (e.g., via the signal Sw) to cause the processor 16 to calculate reference information associated with the touchpad 14 and stores the reference information into the memory 18, wherein details of the reference information have been illustrated above and thus are not repeated again.

Step S43: When the user operates the stylus 100 rather than the learning mode, an operating mode is entered. In the operating mode, the processor 16 obtains current information associated with the touchpad 14, and compares the current information and the reference information to generate calibration information, which includes an angle difference between a reference angle and a current angle that the user holds the stylus 100, a calibrated angle or a calibrated track.

Step S54: The processor 16 then outputs the calibration information via an output interface to the host 32 so as to show the calibrated track on the display 20, referring to FIGS. 2B and 2C.

In an aspect that the stylus 100 has a function of user identity recognition, the operating method further comprises: upon an invalid user being identified, the stylus 100 not outputting the calibration information to the host 32, or outputting a hint signal to the host 32 to control the display 20 to show a message of invalid operation thereon, e.g., showing characters or pictures.

In an aspect that the stylus 100 is allowed to be operated by multiple valid users, the memory 19 respectively records operating features associated with the multiple valid users. When recognizing a specific valid user among the multiple valid users, the stylus 100 further outputs an identity signal associated with the specific valid user to the host 32. The host 32 is arranged to execute different application software or to open different files corresponding to different valid users. In other words, one valid user is allowed to execute the application software or to open the file only related to his/her identity, but is forbidden to execute the application software or to open the file not related to his/her identity. In this way, the data security of the handwriting system 300 is improved, e.g., upon being applied to digital signature.

The stylus 100 of the present disclosure may adopt the interpolation technique to increase the resolution of the reference information and the current information to a sub-pixel scale, e.g., from N pixels to N*M pixels in transverse direction.

In the present disclosure, operations run by the processor 16 are considered to be executed by the stylus 100.

It should be mentioned that although FIGS. 2A to 2C show the images Img_0 to Img_2 by a 2-dimensional space as an example, the present disclosure is not limited thereto. In calculating the finger position/angle, the processor 16 may firstly sum up the sensing values (or called pixel values) of a same column together to form a 1-dimensional data, and then identify the finger position/angle according to the 1-dimensional data. In another aspect, the touchpad 14 uses a 1-dimensional pixel array.

As mentioned above, because a user may hold at a different position each time in using a pen mouse, that can cause an offset on a moving track outputted by the pen mouse due to different angles of the pen mouse being held by the user. Accordingly, the present disclosure further provides a pen mouse that automatically calibrates a current track according to reference information acquired in a learning mode (e.g., FIGS. 1A-1B), a handwriting system including the pen mouse (e.g., FIG. 3) and an operating method thereof (e.g., FIG. 4) that calibrate any holding angle to a reference angle to eliminate the offset on the moving track. Furthermore, the pen mouse of the present disclosure further has a function of user identity recognition (e.g., learning from reference information by an AI algorithm) so as to allow different users to perform different operations or to forbid a usage right of invalid users.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A stylus, comprising:
a pen shaft;
a touchpad, arranged on a part of a surface of the pen shaft for being held by a user;
a memory, configured to record reference information associated with the touchpad; and
a processor, configured to compare current information associated with the touchpad with the reference information to calibrate an offset of a current track of the stylus caused by the user holding at different positions of the touchpad, wherein
the reference information comprises reference raw data outputted by the touchpad in a learning mode, reference object information and reference feature information obtained by processing the reference raw data, and
the current information comprises current raw data outputted by the touchpad in an operating mode, current object information and current feature information obtained by processing the current raw data.

2. The stylus as claimed in claim 1, wherein
the reference object information and the current object information respectively comprise at least one of a respective position, a respective angle, a position of center of gravity and an average angle of multiple fingers on the touchpad, and
the reference feature information and the current feature information respectively comprise at least one of a respective size, a holding posture and a number of the multiple fingers on the touchpad.

3. The stylus as claimed in claim 2, wherein the processor is further configured to
learn and record an operating feature of a valid user according to the reference feature information, and
perform user identify recognition according to the current feature information and the operating feature of the valid user.

4. The stylus as claimed in claim 3, wherein the processor is further configured to
not output information associated with the current track to a post host upon an invalid user being identified in the user identify recognition.

5. The stylus as claimed in claim 1, further comprising:
a pen tip, arranged at a front end of the pen shaft; and
an optical navigation device, arranged in the pen tip and configured to detect the current track.

6. A handwriting system, comprising:
a host, comprising a display to show a cursor track; and a stylus, coupled with the host and comprising a touchpad, the stylus configured to, record reference information associated with the touchpad,
compare current information associated with the touchpad and the reference information to calculate an angle difference between a reference angle and a current angle that the user holds the stylus, and
output the angle difference, a calibrated angle or a calibrated track to the host to show the calibrated track on the display.

7. The handwriting system as claimed in claim 6, wherein
the reference information comprises reference raw data outputted by the touchpad in a learning mode, reference object information and reference feature information obtained by processing the reference raw data, and
the current information comprises current raw data outputted by the touchpad in an operating mode, current object information and current feature information obtained by processing the current raw data.

8. The handwriting system as claimed in claim 7, wherein
the reference object information and the current object information respectively comprise at least one of a respective position, a respective angle, a position of center of gravity and an average angle of multiple fingers on the touchpad, and
the reference feature information and the current feature information respectively comprise at least one of a respective size, a holding posture and a number of the multiple fingers on the touchpad.

9. The handwriting system as claimed in claim 8, wherein the stylus is further configured to
learn and record an operating feature of a valid user according to the reference feature information, and
perform user identify recognition according to the current feature information and the operating feature of the valid user.

10. The handwriting system as claimed in claim 9, wherein the stylus is further configured to
not output the angle difference, the calibrated angle or the calibrated track to the host upon an invalid user being identified in the user identify recognition.

11. The handwriting system as claimed in claim 9, wherein the stylus is further configured to
output a hint signal to the host to control the display to show a message of invalid operation upon an invalid user being identified in the user identify recognition.

12. The handwriting system as claimed in claim 6, wherein the stylus further comprises:
an optical navigation device, arranged in a pen tip of the stylus and configured to detect a current track of the stylus.

13. An operating method of a handwriting system, the handwriting system comprising a stylus having a touchpad and a host having a display, the operating method comprising:
entering a learning mode to record reference information associated with the touchpad;
entering an operating mode to acquire current information associated with the touchpad, and to compare the current information and the reference information to generate calibration information; and
outputting the calibration information to the host to show a calibrated track on the display.

14. The operating method as claimed in claim 13, wherein the reference information comprises reference raw data outputted by the touchpad in a learning mode, reference object information and reference feature information obtained by processing the reference raw data, and the current information comprises current raw data outputted by the touchpad in an operating mode, current object information and current feature information obtained by processing the current raw data.

15. The operating method as claimed in claim 14, wherein the reference object information and the current object information respectively comprise at least one of a respective position, a respective angle, a position of center of gravity and an average angle of multiple fingers on the touchpad, and the reference feature information and the current feature information respectively comprise at least one of a respective size, a holding posture and a number of the multiple fingers on the touchpad.

16. The operating method as claimed in claim 15, further comprising:

learning and recording, by the stylus, an operating feature of a valid user according to the reference feature information, and performing, by the stylus, user identify recognition according to the current feature information and the operating feature of the valid user.

17. The operating method as claimed in claim 16, further comprising:

not outputting information associated with the calibration information by the stylus to the host upon an invalid user being identified in the user identify recognition, or outputting a hint signal by the stylus to the host to control the display to show a message of invalid operation upon an invalid user being identified in the user identify recognition.

18. The operating method as claimed in claim 13, wherein the calibration information comprises an angle difference between a reference angle and a current angle that the user holds the stylus, a calibrated angle or a calibrated track.

19. A stylus, comprising:

a pen shaft;

a touchpad, arranged on a part of a surface of the pen shaft for being held by a user;

a memory, configured to record reference information associated with the touchpad; and a processor, configured to compare current information associated with the touchpad with the reference information to calibrate an offset of a current track of the stylus caused by the user holding at different positions of the touchpad, wherein the processor is configured to compare the current information and the reference information to calculate an angle difference between a reference angle and a current angle that the user holds the stylus, and output the angle difference, a calibrated angle or a calibrated track to a post host.

* * * * *